(12) United States Patent
Tao (10) Patent No.: US 10,298,793 B2
(45) Date of Patent: May 21, 2019

(54) IMAGING DEVICES WITH DRIVE ASSEMBLY AND DRIVE ASSEMBLY LOCKING MECHANISM

(71) Applicants: Hewlett-Packard Development Company, L.P., Houston, TX (US); Qian Tao, Singapore (SG)

(72) Inventor: Qian Tao, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/763,511

(22) PCT Filed: Jan. 25, 2016

(86) PCT No.: PCT/CN2016/071961
§ 371 (c)(1),
(2) Date: Mar. 27, 2018

(87) PCT Pub. No.: WO2017/127975
PCT Pub. Date: Aug. 3, 2017

(65) Prior Publication Data
US 2018/0270377 A1    Sep. 20, 2018

(51) Int. Cl.
*H04N 1/00* (2006.01)
*G03G 15/00* (2006.01)
*G03G 21/16* (2006.01)

(52) U.S. Cl.
CPC ....... *H04N 1/00652* (2013.01); *G03G 15/602* (2013.01); *G03G 15/6529* (2013.01); *G03G 21/1647* (2013.01); *H04N 1/00588* (2013.01)

(58) Field of Classification Search
None
See application file for complete search history.

(56) References Cited

U.S. PATENT DOCUMENTS

| 6,903,848 | B2 | 6/2005 | Kirita |
| 6,982,815 | B2 | 1/2006 | Tsutsumi |
| 7,466,461 | B2 | 12/2008 | Chen et al. |
| 7,775,515 | B2 * | 8/2010 | Shingai .............. H04N 1/00572 271/186 |

(Continued)

FOREIGN PATENT DOCUMENTS

| CN | 1637661 | 7/2005 |
| CN | 101738904 | 6/2010 |

(Continued)

*Primary Examiner* — Paul F Payer
(74) *Attorney, Agent, or Firm* — HP Inc. Patent Department (57) ABSTRACT

Examples of an imaging device (100) are described herein. In an example, the imaging device (100) includes a drive control assembly (110), a first drive assembly (106), a second drive assembly (108), a movable carriage (102), and a locking mechanism (112). The drive control assembly (110) can be used to regulate transmission of drive from an actuator (200) to the first drive assembly (106) and the second drive assembly (108). The locking mechanism (112) can lock the drive control assembly (110) in an engaged position with the first drive assembly (106) or the second drive assembly (108). The movable carriage (102) can actuate the locking mechanism (112) to lock the drive control assembly (110) in the engaged position.

15 Claims, 6 Drawing Sheets

(56) References Cited

U.S. PATENT DOCUMENTS

| | | | |
|---|---|---|---|
| 7,934,717 B2 * | 5/2011 | Takeda | B65H 9/008 |
| | | | 271/186 |
| 8,666,286 B2 | 3/2014 | Shingai | |
| 8,848,264 B2 * | 9/2014 | Mori | H04N 1/00013 |
| | | | 271/10.11 |
| 8,919,761 B2 * | 12/2014 | Morinaga | B65H 3/0669 |
| | | | 271/10.04 |
| 8,928,959 B2 * | 1/2015 | Ishikawa | H04N 1/00127 |
| | | | 271/225 |
| 8,970,927 B2 * | 3/2015 | Ishikawa | H04N 1/121 |
| | | | 271/126 |
| 9,013,726 B2 * | 4/2015 | Miyamoto | H04N 1/00596 |
| | | | 358/1.1 |
| 9,363,401 B2 * | 6/2016 | Sahara | H04N 1/00891 |
| 2013/0194599 A1 | 8/2013 | Tomodo et al. | |
| 2014/0147146 A1 | 5/2014 | Kobayashi et al. | |
| 2015/0251866 A1 | 9/2015 | Shimizu | |

FOREIGN PATENT DOCUMENTS

| | | |
|---|---|---|
| CN | 102269953 | 12/2011 |
| CN | 104849977 | 8/2015 |

* cited by examiner

IMAGING DEVICES WITH DRIVE ASSEMBLY AND DRIVE ASSEMBLY LOCKING MECHANISM

BACKGROUND

Imaging devices, such as scanners, copiers, and printers, can be used for printing matter on a medium, such as paper, by a non-contact process or for capturing a digital image of matter printed on the medium. The matter can include, for example, a picture or text or a combination thereof. The imaging device can have an image-forming mechanism, such as a scan head of a scanner or a printhead of a printer, to capture the image of the printed matter or for printing the matter on the medium. Accordingly, a relative movement can be provided between the medium and the image-forming mechanism by moving the medium or the image-forming mechanism or both.

BRIEF DESCRIPTION OF FIGURES

The detailed description is provided with reference to the accompanying figures. It should be noted that the description and the figures are merely examples of the present subject matter and are not meant to represent the subject matter itself.

DETAILED DESCRIPTION

Generally, imaging devices, such as scanners, copiers, and printers, may be operable either for printing matter on a medium or for capturing a digital image of matter printed on the medium. To achieve the same, an imaging device can operate in various manners. Typically, construction of the imaging devices is such that the imaging devices may be operable in a single manner at one time. For example, in one case, the imaging device may be able to use one manner of feeding the medium, i.e., either manual feed or automatic feed to the imaging device. In another case, the image-forming mechanism may be operable in one manner, i.e., either in stationary mode where the medium can be provided motion or in mobile mode where the image-forming mechanism may move relative to a stationary medium.

Further, each manner of operation may have certain properties associated therewith and may find application for different types of jobs. However since the imaging device is operable in a single manner, for each different manner, a separate imaging device is deployed. Accordingly, cost of producing jobs using the imaging devices is overall high. Moreover, operation of separate imaging devices may be cumbersome as each imaging device is individually maintained. Therefore, such operation of the imaging devices may be considerably low on effectiveness.

The present subject matter relates to multi-way operation of an imaging device, such as a printer or a scanner. The present subject matter provides for an image-forming mechanism of the imaging device to operate in a plurality of modes, for example, in a first mode and a second mode. As an example, in case the imaging device is a printer, the image-forming mechanism can be a printhead of the printer. In case the imaging device is a scanner or a copier, the image-forming mechanism can be a scanning head of the scanner. The image-forming mechanism can be mounted on a movable carriage. Further, for instance, the first mode can be a movable mode in which the image-forming mechanism is mobile and the second mode can be a stationary mode in which the image-forming mechanism can remain stationary.

The imaging device includes a first drive assembly to operate the imaging device in the first mode, and a second drive assembly to operate the imaging device in the second mode. The imaging device further includes an actuator, such as a motor, to provide drive to the first drive assembly and the second drive assembly. In addition, the imaging device can include a drive control assembly to transmit the drive from the actuator to the first drive assembly or the second drive assembly. In other words, at a given instant, either the first drive assembly is operational or the second drive assembly is operational so that the imaging device is operating in either the first mode or the second mode.

In accordance to an aspect, the imaging device can further include a locking mechanism which can be used to lock the drive control assembly in an engaged position, i.e., when engaged with the first drive assembly or the second drive assembly or both. Such a provision allows the drive to be effectively transmitted from the actuator to the appropriate drive assembly for operation. In one example, the locking mechanism can be operable by the carriage of the image-forming mechanism. In said example, the carriage can be actuated to operate the locking mechanism and allowing for engagement and disengagement of the drive control assembly. Accordingly, the movement of the carriage can be controlled to switch the transmission of drive between the first drive assembly and the second drive assembly, in turn, to change the mode of operation of the imaging device. Such a provision may allow for a simple construction of the imaging device as the imaging device does not have any separate components for regulating the locking mechanism.

The above aspects are further described in the figures and in associated description below. It should be noted that the description and figures merely illustrate principles of the present subject matter. Therefore, various arrangements that encompass the principles of the present subject matter, although not explicitly described or shown herein, can be devised from the description and are included within its scope. Additionally, the word "coupled" is used throughout for clarity of the description and can include either a direct connection or an indirect connection.

Figure 1:
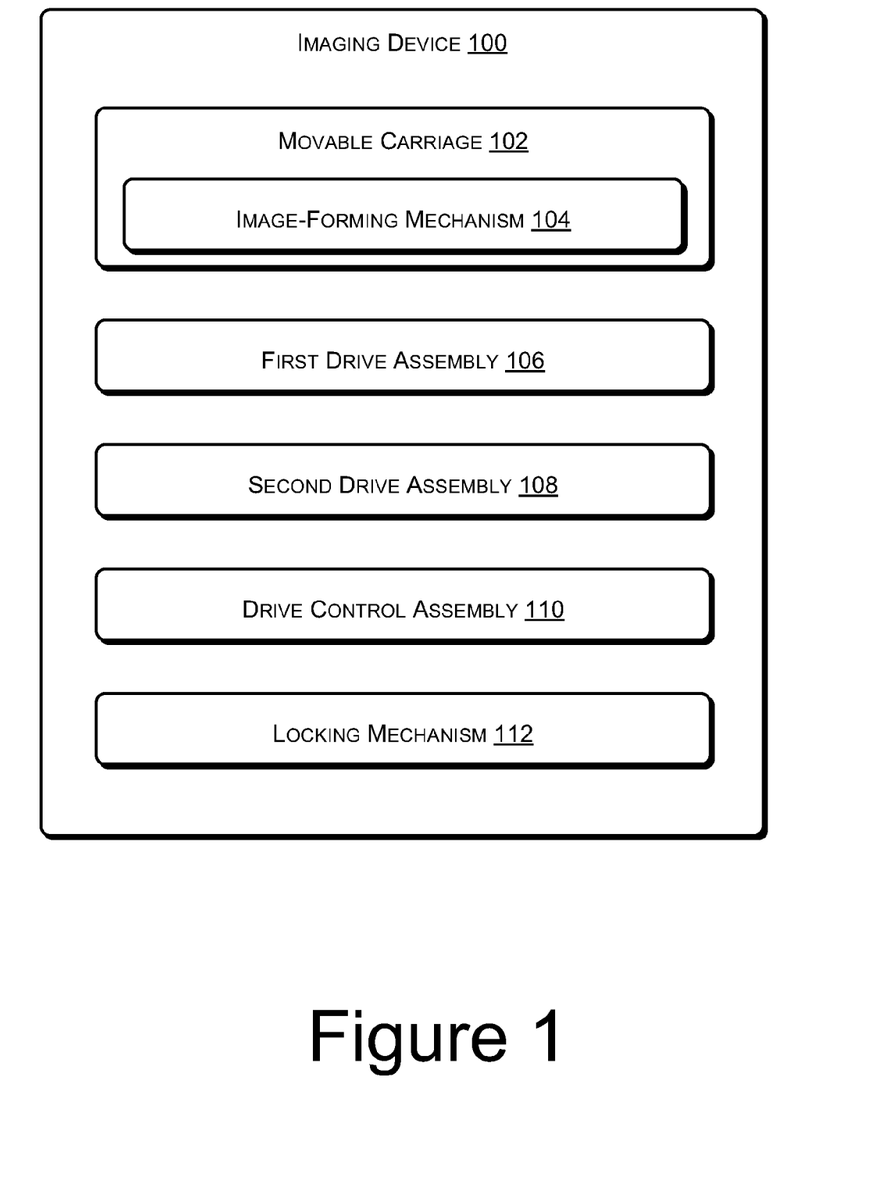
FIG. 1 illustrates a schematic of an imaging device, according to an example.

FIG. 1 illustrates a schematic of an imaging device 100, according to an example of the present subject matter. In an example, the imaging device 100 may include a movable carriage 102 to carry an image-forming mechanism 104 mounted on the movable carriage 102. According to said example, the imaging device 100 may operate in two modes, namely, a first mode and a second mode. For instance, the first mode of operation can be a mobile mode in which the image-forming mechanism 104 is movable. In the same example, the second mode can be a stationary mode in which the image-forming mechanism 104 is stationary. In such a case, a medium can move with reference to the image-forming mechanism 104 for the operation of the imaging device 100. The image-forming mechanism 104, in one example, can be a printhead, in case the imaging device 100 is a printer or the image-forming mechanism can be a scan head, in case the imaging device 100 is a scanner.

Further, in an example, the imaging device 100 includes a first drive assembly 106 operably coupled to the image-forming mechanism 104. The first drive assembly 106, in operation, may operate the image-forming mechanism 104 in a first mode of operation, for example, to provide reciprocatory motion to the image-forming mechanism 104. In addition, in the first mode, the medium can be stationary and the image-forming mechanism 104 may be moved relative to the medium.

The imaging device 100 may further include a second drive assembly 108 operably coupled to the image-forming mechanism 104 to operate the imaging device 100 in a second mode of operation. As mentioned in the above example, the second mode can be a mode where the image forming mechanism 104 is stationary, and therefore, in the second mode the image-forming mechanism 104 can be rendered immobile. Further, in said example, the second drive assembly 108 can facilitate the feeding of the medium to the imaging-forming mechanism 104 and, therefore, can facilitate the image-forming mechanism 104 to operate in the second mode.

In addition, the imaging device 100 may include a drive control assembly 110 to regulate transmission of drive from an actuator (not shown in Figure) to the first drive assembly 106 and the second drive assembly 108. The drive control assembly 110, in operation, may drive the first drive assembly 106 when the first drive assembly 106 in engaged with the image-forming mechanism 104. Alternatively, the drive control assembly 110 may drive the second drive assembly 110 when the second drive assembly 108 is engaged with the image-forming mechanism 104.

Further, according to an aspect, the imaging device 100 includes a locking mechanism 112 to lock the drive control assembly in engaged position with either the first drive assembly 106 or the second drive assembly 108. According to said aspect, in an example, the locking mechanism 112 can be operable by the movable carriage 102. The imaging device 100 and the components and operation thereof are explained in further detail with reference to FIG. 2, FIG. 3A, FIG. 3B, FIG. 4A, and FIG. 4B.

Figure 2:
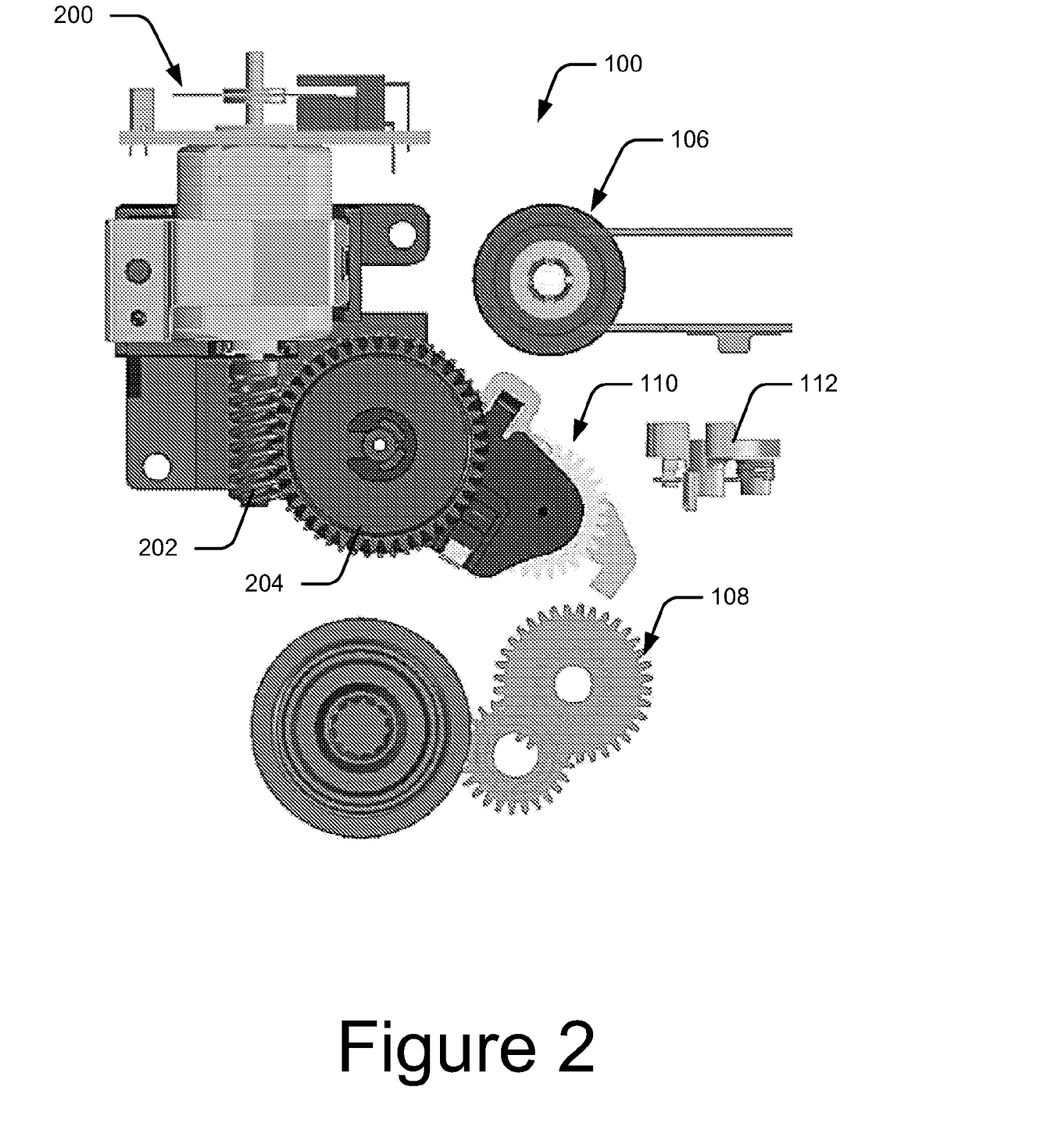
FIG. 2 illustrates a top view of components of the imaging device, according to an example.

FIG. 2 illustrates various components of the imaging device 100, in accordance with one example of the present subject matter. As mentioned previously, the first drive assembly 106 may operate the movable carriage 102 for moving the image-forming mechanism 104 (not shown in FIG. 2) in the first mode of operation. In such a case, the movable carriage 102 may execute a reciprocatory motion to provide motion to the image-forming mechanism 104. In the first mode, the medium can be stationary and the image-forming mechanism 104 may be moved relative to the medium. Further, the second drive assembly 108 may operate the image-forming mechanism 104 in the second mode by rendering the image-forming mechanism 104 stationary and facilitating feed of the medium to the stationary image-forming mechanism 104.

In an example, the first drive assembly 106 can be a gear train, a belt drive, a chain drive, or a combination thereof. Similarly, the second drive assembly 108 can be a gear train, a belt drive, a chain drive, or a combination thereof. For instance, in the example illustrated in FIG. 2, the first drive assembly 106 can be a belt drive assembly whereas the second drive assembly 108 can be a gear drive assembly. In said example, the movable carriage 102 can be fixed coupled to a belt of the belt drive assembly and can be provided a reciprocatory motion between two terminal pulleys of the belt drive assembly. Further, in said example, the second drive assembly 108 can operate a feeding mechanism (not shown) of the imaging device 100 in the second mode for feeding medium relative to the stationary image-forming mechanism 104.

Further, the drive control assembly 110 is responsible for operating the first drive assembly 106 or the second drive assembly 108, as the case may be, to operate the image-forming mechanism 104 (shown in FIG. 1) in the first mode or the second mode respectively. To achieve such operation, the drive control assembly 110 may receive drive from an actuator 200. For instance, the actuator 200 can be a stepper motor or a servomotor. The actuator 200 may be secured to a body (not shown in Figure) of the imaging device 100. In an example, the actuator 200 may transmit the drive to the drive control assembly 110 through a transmission assembly, such as a gear train. In one example, the gear train can include a worm 202 and a worm wheel 204, the worm 202 being mounted on a shaft of the actuator 200 and the worm wheel 204 being a part of the drive control assembly 110 and engaged with the worm 202 to the operate the control assembly 110.

The drive control assembly 110, in operation, may toggle the transmission of drive from the actuator 200 between the first drive assembly 106 and the second assembly 108 to change the mode of operation of the image-forming mechanism 104. Therefore, at any given instant, the drive control assembly 110 may be engaged with either the first drive assembly 106 or the second drive assembly 108.

Further, in order to lock the drive control assembly 110 in the engaged position with either the first drive assembly 106 or the second drive assembly 108, the locking mechanism 112 may be operated and brought into operation. The locking mechanism 112 ensures that the drive control assembly 110 remains engaged with the drive assembly 106, 108, while the imaging device 100 is in operation. As mentioned previously, the locking mechanism 112 may be actuable or operable by movement of the movable carriage 102.

Figure 3A:
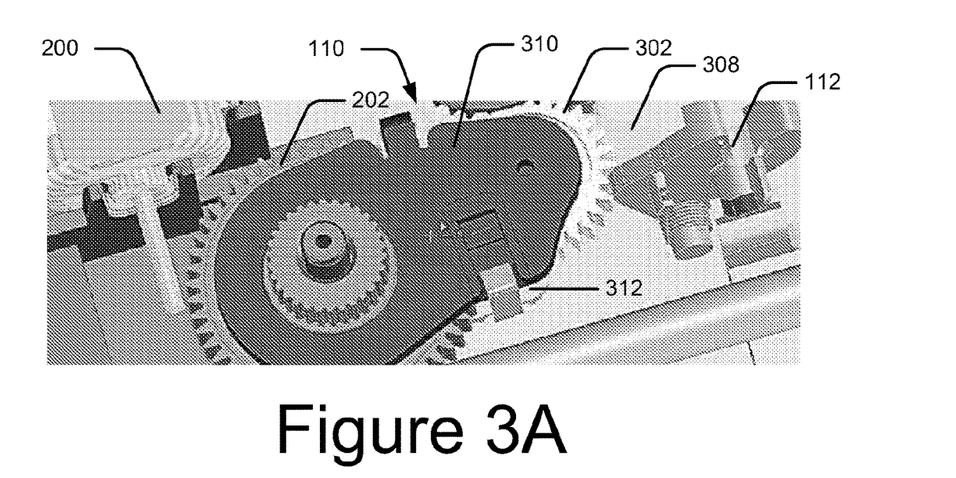
FIG. 3A and FIG. 3B illustrate a drive control assembly of the imaging device, according to an example.
Figure 3B:
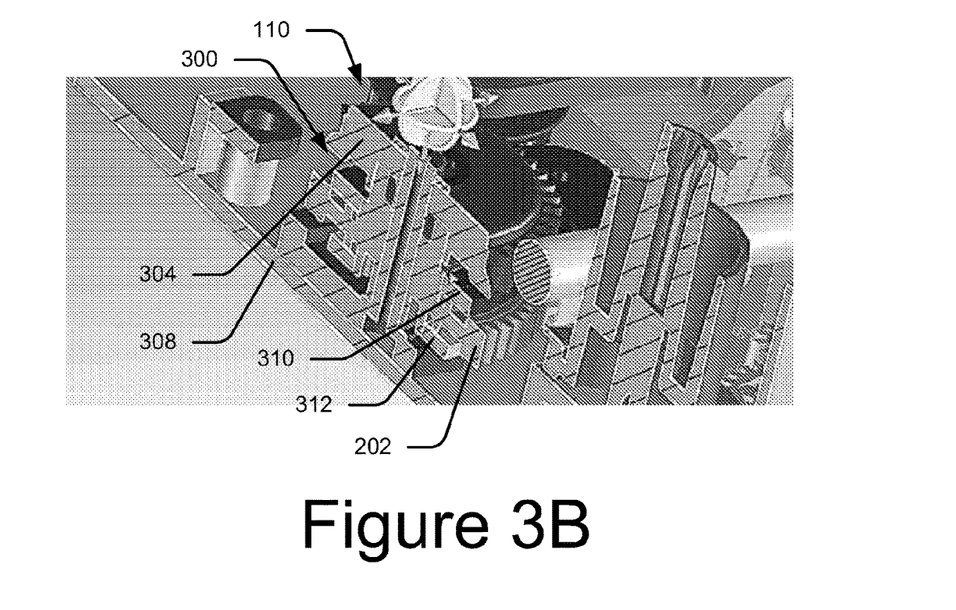

FIG. 3A and FIG. 3B illustrates the drive control assembly 110, in accordance with one example of the present subject matter. In said example, FIG. 3A represents a top view of the drive control assembly 110 whereas FIG. 3B illustrates a cut section view of the drive control assembly 110. For the sake of brevity and for the ease of understanding, FIG. 3A and FIG. 3B are explained in conjunction.

As mentioned previously, the drive control assembly 110 is operably coupled to the actuator 200 and regulates the transmission of drive by engaging with and disengaging from the first drive assembly 106 and the second drive assembly 108, based on the mode of operation of the imaging device 100. In an example, the drive control assembly 110 can be a swing arm assembly. In said example, the swing arm assembly can include a gear train having a driving transmission member 300 engaged with an engaging transmission member 302. For instance, the driving transmission member 300 and the engaging transmission member 302 can be formed as gears, such as spur gears or helical gears.

In addition, the driving transmission member 300 can obtain the drive from the actuator 200 and can transmit the drive to the engaging transmission member 302. In the example described earlier, the actuator 200 can have the worm 202 engaged to the worm wheel 204, i.e., the driving transmission member 300, which is a part of the drive control assembly 110. The engaging transmission member 302 can further transmit the drive to the first drive assembly 106 or the second drive assembly 108, depending on the mode of operation in which the imaging device 100 is to be operated.

In another case, the driving transmission member 300 can be formed of a coupling of two gear wheels, i.e., a worm wheel 204 and a drive gear 304 fixedly mounted coaxially on the worm wheel 204. The drive gear 304 can be mounted on a projected portion of the worm wheel 204 extending along a central longitudinal axis of the worm wheel 204. For instance, the projected portion of the worm wheel 204 can have external splines and a mounting hole of the drive gear 304 can have internal splines to engage with and mount on the external splines of the projected portion. In operation, the worm wheel 204 can be engaged with the worm 202 to obtain the drive from the actuator 200 through the worm 202, and the worm wheel 204 and the drive gear 304 can rotate as a single unit, i.e., the driving transmission member 300. The drive gear 304 can be engaged with the engaging transmission member 302 to transmit the drive thereto. For instance, the worm wheel 204 can be a helical gear whereas the drive gear 304 can be a spur gear.

For operation, the driving transmission member 300 can be rotatably mounted at a fixed location, such as a mounting member 306, on a body 308 of the imaging device 100 and can transmit the drive to the engaging transmission member 302. Further, to hold the driving transmission member 300 and the engaging transmission member 302 in the engaged position, the drive control assembly 110, i.e., the swing arm assembly in the present example, may include a lateral plate 310. Similar to the driving transmission member 300, the lateral plate 310 can be rotatably mounted at the same fixed location on the body 308 of the imaging device 100. The engaging transmission member 302 can be mounted rotatably on the lateral plate 310. In another case, the swing arm assembly can include a plurality of lateral plates 310, 312 so that the lateral plates 310, 312 are parallel to each other in the mounted position. In such a case, the engaging transmission member 302 can be mounted rotatably between the lateral plates 310, 312, either on one of the lateral plates 310, 312 or both.

The lateral plate 310 and the driving transmission member 300 can be mounted on the fixed location with such a fit, for instance, transition fit, that the drive control assembly 110 can rotate along with the driving transmission member 300 in unison, i.e., as a single unit. In other words, in said example, when the swing arm assembly is being operated to change the mode of operation, the drive control assembly 110 can actuate as a single unit to disengage the engaging transmission member 302 from one drive assembly 106, 108 and engage with the other. However, when the movement of the swing arm assembly is stalled, i.e., the engaging transmission member 302 is engaged, and the driving transmission member 300 is rotated, the power is transmitted to the engaging transmission member 302.

In another example, the driving transmission member 300 may be mounted on the lateral plate 310 instead of being directly mounted on the mounting member 306. For instance, the lateral plate 310 may have a cylindrical projection by which the lateral plate 310 can be mounted on the mounting member 306. Further, the driving transmission member 300 may be mounted on the cylindrical projection of the lateral plate 310. As mentioned previously, the driving transmission member 300 may be mounted on the lateral plate 310 bearing a transition fit. Accordingly, the drive control assembly 110 can move about the fixed location as a single unit when the drive control assembly 110 is not engaged with either the first drive assembly 106 or the second drive assembly 108. When the drive control assembly 106 is in the engaged position, the driving transmission member 300 can rotate with respect to the plate 312, by virtue of the transition fit.

Further, in addition to serve as a coupling element for the drive control assembly 110, the lateral plate 310 may also facilitate in the locking of the drive control assembly 110 in the engaged position with the drive assembly 106, 108. According to an aspect, the lateral plate 310 may have a cooperating element to cooperate with the locking mechanism 112. In an example, cooperating element can be an extended portion on the lateral plate 310 to engage with the locking mechanism 112. The manner by which the locking mechanism 112 may lock the drive control assembly 110 is explained with respect to FIG. 4A and FIG. 4B.

Figure 4A:
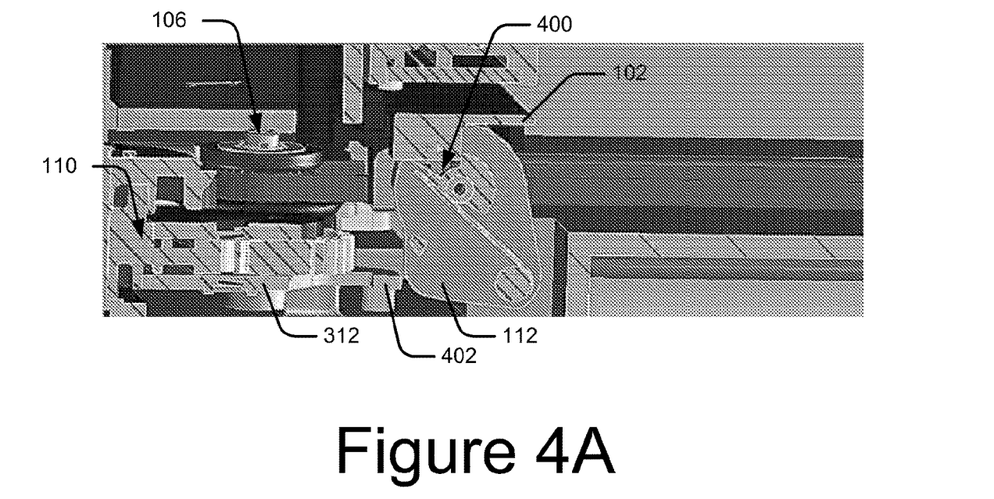
FIG. 4A and FIG. 4B illustrate a locking mechanism of the imaging device, according to an example.
Figure 4B:
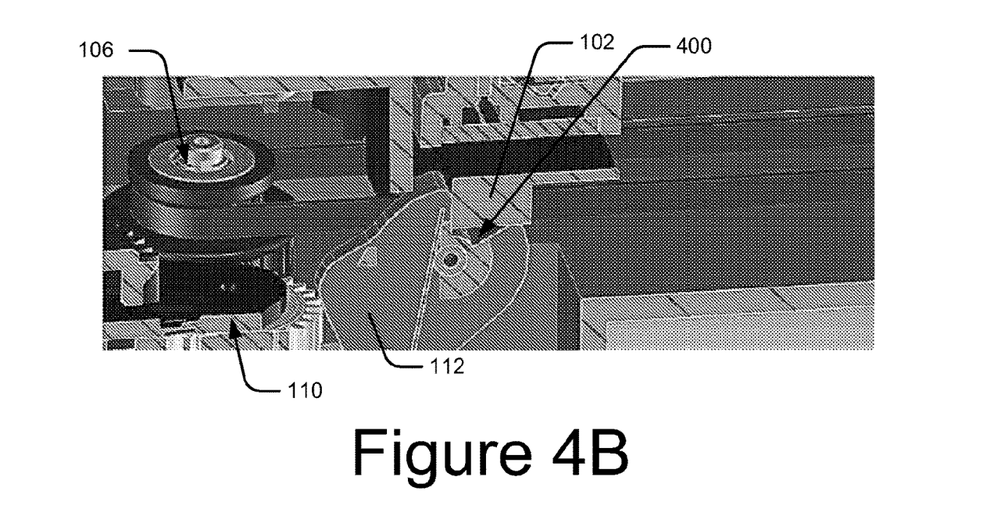

FIG. 4A and FIG. 4B illustrates the locking mechanism 112, in accordance with one example of the present subject matter. Further, FIG. 4A illustrates the locking mechanism 112 securing the drive control assembly 110 with the first drive assembly 106 while FIG. 4B illustrates the locking mechanism 112 when the lock is released and the drive control assembly 110 may engage with the second drive assembly 108.

In the illustrated aspect, the locking mechanism 112 may have a first cooperating element 400 to cooperate with the movable carriage 102 to actuate the locking mechanism 112 and lock the drive control assembly 110. In an example, the locking mechanism 112 can be formed as a flat-shaped component. In such a case, the first cooperating element 400 can be a depression formed in a flat-shaped body of the locking mechanism 112 to receive a protrusion of the movable carriage 102 for actuation.

In addition, the locking mechanism 112 may include a second cooperating element 402 to cooperate with the drive control assembly 110 and lock the drive control assembly 110 in the engaged position. The second cooperating element 402 may interact with the cooperation element of the lateral plate 310 to lock the drive control assembly 110. In the above example where the cooperating member of the lateral plate 310 is formed as an extended portion, the second cooperating element 402 can be formed as a hole or in any other shape that can clasp with the cooperating member of the lateral plate 310.

According to an aspect, the locking mechanism 112 may be pivotably mounted on the body 308 of the imaging device 100 to pivot to different positions for locking and unlocking the drive control assembly 110. Further, the locking mechanism 112 may be spring loaded.

Further, in an example, the imaging device 100 can include a control device (not shown) to, among other things, precisely regulate the movement of various components, for instance, the actuator and the movable carriage 102. In an example, the control device may be a microprocessor, a microcomputer, a microcontroller, a digital signal processor, a central processing unit, a state machine, a logic circuitry, and/or any other device that can manipulate signals and data based on computer-readable instructions. For instance, the control device can regulate the operation of the actuator 200 to operate the drive control assembly 110 to, in turn, operate either the first drive assembly 106 or the second drive assembly 108.

In operation, the control device can determine whether there is a change in the mode of operation of the imaging device 100, and accordingly, the control device can determine a selected mode of operation for operating the imaging device 100. For example, the imaging device 100 may be operating in the first mode and may be prompted to change the mode of operation to the second mode. In addition, the control device can operate the actuator 200 to engage the drive control assembly 110 with one of the first drive assembly 106 and the second drive assembly 108, depending on the selected mode of operation. According to an aspect, the control device can actuate the movable carriage 102 to unlock the drive control assembly 110 from a previous engaged position when the imaging device 100 is in a previous mode of operation. Subsequently, the control device can actuate the movable carriage 102 to operate the locking mechanism 112 of the imaging device 100 to lock the drive control assembly 110 in the engaged position.

The control device may actuate the actuator 200 to rotate the drive control assembly 110 in different directions based on the mode of the operation to be achieved. In one example, as an initial position, the imaging device 100 may be operated in the first mode of operation. As the control device is prompted to switch the operation from the first mode of operation to the second mode of operation, for instance, by a user, the control device may determine the current position of the movable carriage 102. In an example, when the movable carriage is determined to be not in a position for the second mode of operation, the control device can actuate the actuator 200 to rotate in a first direction to transmit the drive to the first drive assembly 106 to bring the movable carriage 102 in position for the second mode of operation.

Further, as the movable carriage 102 is brought in position for the second mode, the movable carriage 102 may make contact with the locking mechanism 112. For example, the first cooperating element 400 of the locking mechanism 112 may receive the protrusion of the movable carriage 102. As the movable carriage 102 is moved further, the locking mechanism 112 pivots to unlock the drive control assembly 110. For instance, the second cooperating element 402 of the locking mechanism 112 may disengage from the cooperating element of the plate 312, thereby allowing movement of the drive control assembly 110.

The control unit further rotates the actuator in a second direction, opposite to the first direction, to disengage the drive control assembly 110 from the first drive assembly 106. In effect, in one example, the driving transmission member 300 can be transmitted the drive and by virtue of the transition fit, as explained above, can cause rotation of the drive control assembly 110 about the mounting member 306. As the drive control assembly 110 rotates, the engaging transmission member 302 engages with the second drive assembly 108. As soon as the engaging transmission member 300 engages with the second drive assembly 102, the drive control assembly 110 stops rotating further as a single unit and the engaging transmission member 302 can start transmitting drive to the second drive assembly 108.

In one example, during the operation of the imaging device in the second mode, the movable carriage 102 holds the locking mechanism 112 in the unlocked position. In another example, however, the control device can actuate the movable carriage 102 further to bring the movable carriage 102 in position for the second mode of operation. In the process, the movable carriage 102 can actuate the locking mechanism 112 to lock the drive control assembly in the engaged position in the second mode of operation.

Further, when prompted, by the user, to change the mode of the imaging device 100 back in the first mode, the control device may actuate the actuator 200 to rotate in the first direction. Accordingly, the actuator 200 rotates the drive control assembly 110 in the opposite direction, thereby disengaging the engaging transmission member 302 from the second drive assembly 108 and re-engaging the engaging transmission member 302 with the first drive assembly 106.

In the above example where the locking mechanism 112 is held in the unlocked position in the second mode of operation, as the drive control assembly 110 engages with the first drive assembly 106, the first drive assembly 106 can drive the movable carriage 102 to actuate the locking mechanism 112 and lock the drive control assembly 110. Thus, during operation, the control device may regulate the toggling of the imaging device 100 between the first mode and the second mode of operation.

Figure 5:
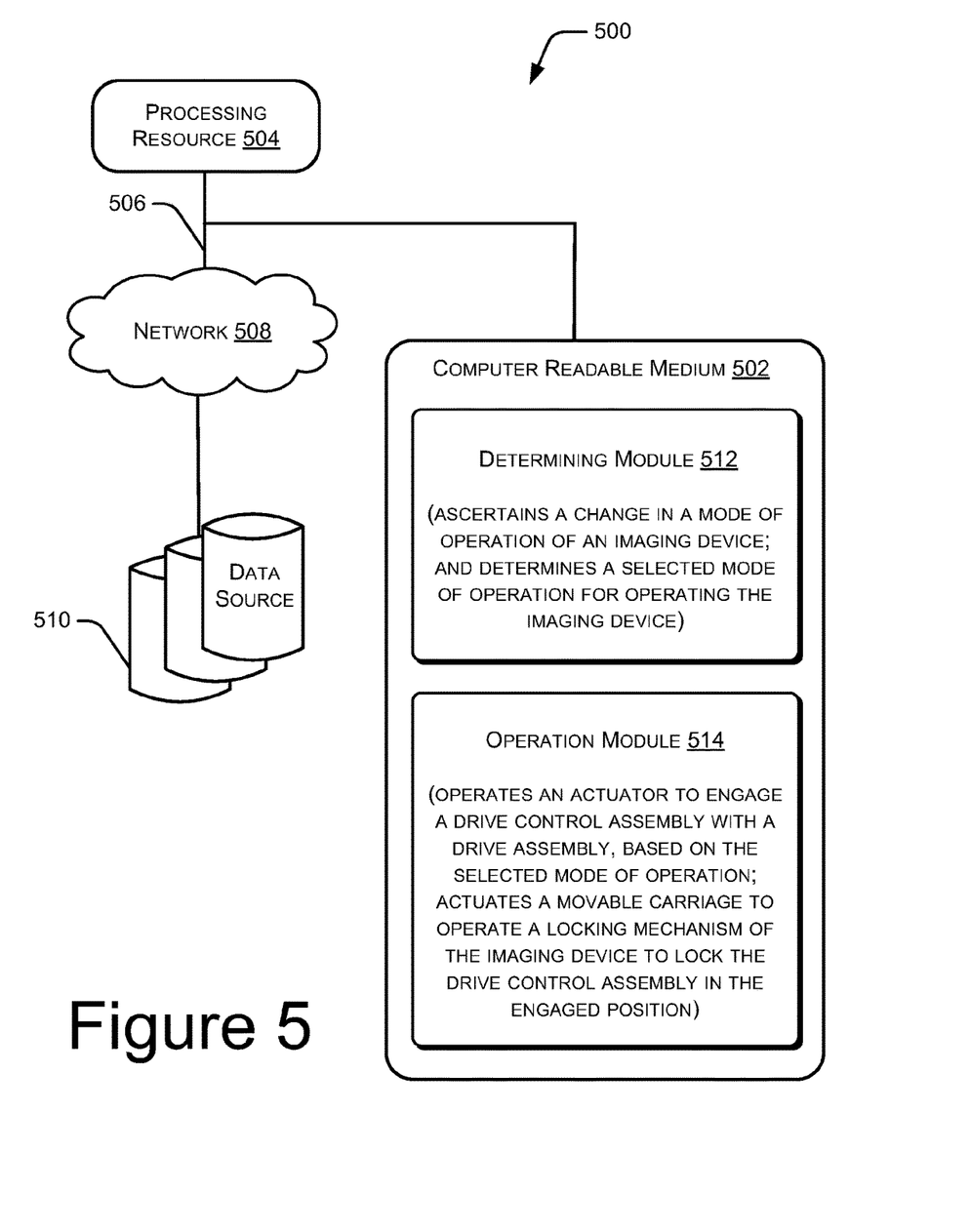
FIG. 5 illustrates a network environment for operating an imaging device, according to an example.

FIG. 5 illustrates an example network environment 500 using a non-transitory computer readable medium 502 for stalling operation of an imaging device 100, according to an example of the present subject matter. The network environment 500 may be a public networking environment or a private networking environment. In one example, the network environment 500 includes a processing resource 504 communicatively coupled to the non-transitory computer readable medium 502 through a communication link 506.

For example, the processing resource 504 can be a processor, such as the control device of the imaging device 100. The non-transitory computer readable medium 502 can be, for example, an internal memory device or an external memory device. In one example, the communication link 506 may be a direct communication link, such as one formed through a memory read/write interface. In another example, the communication link 506 may be an indirect communication link, such as one formed through a network interface. In such a case, the processing resource 504 can access the non-transitory computer readable medium 502 through a network 508. The network 508 may be a single network or a combination of multiple networks and may use a variety of communication protocols.

The processing resource 504 and the non-transitory computer readable medium 502 may also be communicatively coupled to data sources 510 over the network 508. The data sources 510 can include, for example, databases and computing devices. The data sources 510 may be used by the database administrators and other users to communicate with the processing resource 504.

In one example, the non-transitory computer readable medium 502 can include a set of computer readable instructions, such as a determining module 512 and an operation module 514. The set of computer readable instructions, referred to as instructions hereinafter, can be accessed by the processing resource 504 through the communication link 506 and subsequently executed to perform acts for network service insertion. In other words, during operation the processing resource 504 can execute the determining module 512 and the operation module 514.

On execution by the processing resource 504, the determining module 512 can ascertain a change in a mode of operation of the imaging device 100. For example, based on a prompt from a user, the mode of operation of the imaging device 100 may have to be changed. For instance, in case the imaging device 100 is a two-in-one scanner, the imaging device 100 can be operable as a flatbed scanner, i.e., first mode of operation, and as an automatic document feeder (ADF) scanner, i.e., second mode of operation. Accordingly, the imaging device 100 may be operating in one mode and may be prompted to change the mode of operation.

Further, the determining module 512 can determine a selected mode of operation for operating the imaging device 100. In the above example, the imaging device 100 may be operating in the first mode as the flatbed scanner and the second mode of operation may be selected for operation of the imaging device 100 as the ADF scanner.

Further, the operation module 514 can operate the actuator 200 to engage the drive control assembly 110 with one of the first drive assembly 106 and the second drive assembly 108, depending on the selected mode of operation. For example, if the selected mode of operation is second mode, then the operation module 514 can operate the actuator 200 to engage with the second drive assembly 108. As explained previously, the actuator 200 can actuate the drive control assembly 110 to first engage with the second drive assembly 108 and, once engaged, to transmit the drive thereto.

In addition, the operation module 514 can actuate the movable carriage 102 to operate the locking mechanism 112 of the imaging device 100 to lock the drive control assembly 110 in the engaged position. In an example, the operation module 514 can, first, actuate the movable carriage 102 to unlock the drive control assembly 110 from a previous engaged position when the imaging device 100 is in a previous mode of operation. In order to be able to carry out the above explained operation, the operation module 514 can determine a current position of the drive control assembly 110 and a current position of the movable carriage 102. In one example, the current positions of the drive control assembly 110 and the movable carriage 102 refer to the positions of the drive control assembly 110 and the movable carriage 102 in the previous mode of operation.

The construction and operation of the first drive assembly 106, the second drive assembly 108, the drive control assembly 110, and the locking mechanism 112 is the same as explained with reference to FIG. 2, FIG. 3A, FIG. 3B, FIG. 4A, and FIG. 4B.

Figure 6:
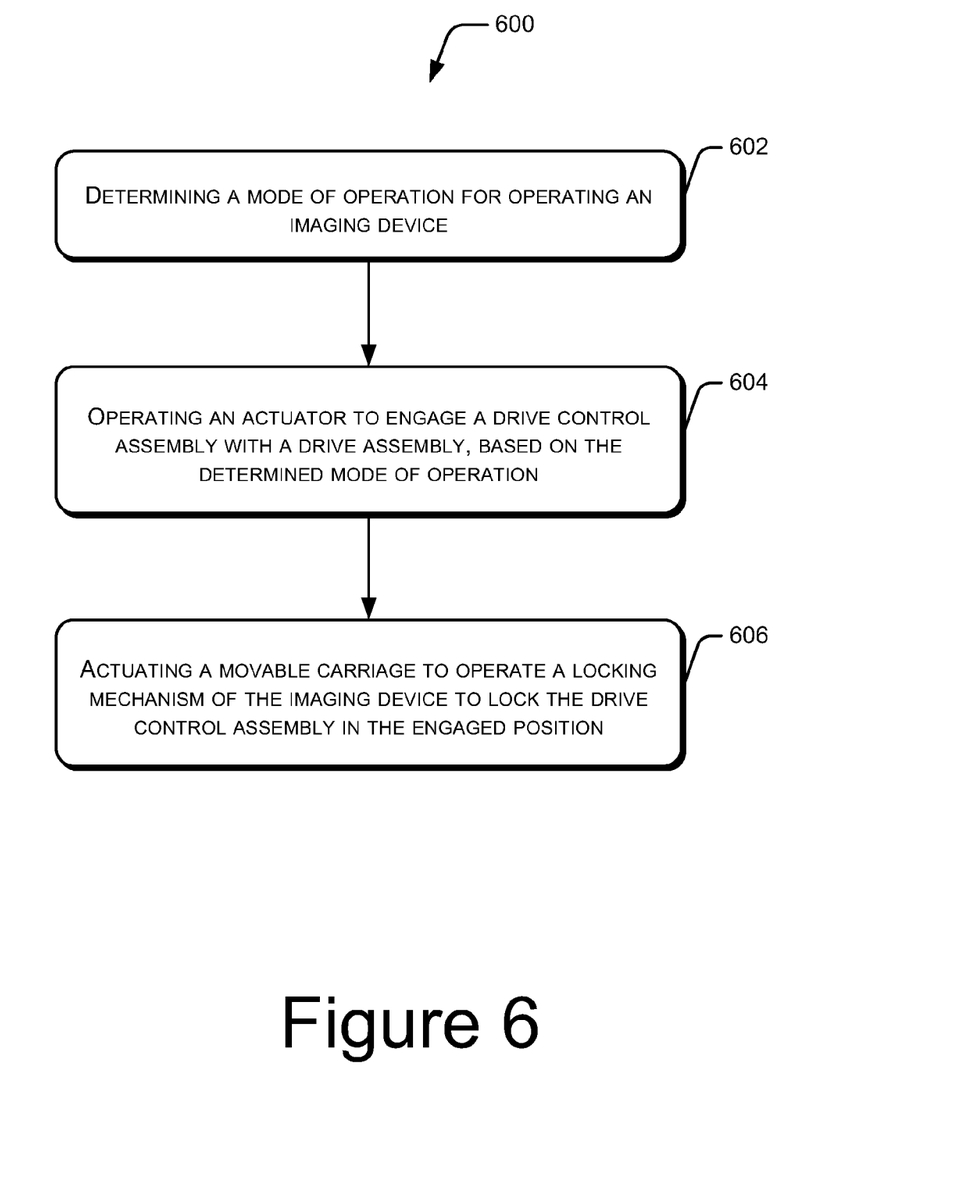
FIG. 6 illustrates a method for operating an imaging device, according to an example.

Method 600 is described in FIG. 6 for operating the imaging device 100, according to an example of the present subject matter. The order in which the method 600 is described is not intended to be construed as a limitation, and any number of the described method blocks can be combined in any appropriate order to carry out the method 600 or an alternative method. Additionally, individual blocks may be deleted from the method 600 without departing from the spirit and scope of the subject matter described herein.

The method 600 can be performed by programmed computing devices, for example, based on instructions retrieved from the non-transitory computer readable medium or non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 6, the method 600 may be performed by a control device, such as the control device of the imaging device 100.

At block 602, a mode of operation is determined for operating the imaging device 100. For example, the imaging device 100 may be prompted to change the mode of operation from a current mode of operation. For example, the imaging device 100 may be operating in the first mode of operation in which the image-forming mechanism 104 is in a mobile mode of operation. The determined mode of operation can be the second mode of operation in which the image-forming mechanism 104 is in a stationary mode.

At block 604, the actuator 200 is operated to engage the drive control assembly 110 with a drive assembly, i.e., to engage with one of the first drive assembly 106 and the second drive assembly 108, depending on the determined mode of operation. In the above example where the determined mode of operation is the second mode, the actuator 200 can be actuated to engage the drive control assembly 110 with the second drive assembly 108 to provide drive thereto for operating in the second mode.

At block 606, the movable carriage 102 is actuated to operate the locking mechanism 112 of the imaging device 100 to lock the drive control assembly 110 in the engaged position. The movable carriage 102 can be actuated to position the image-forming assembly 104 appropriately for operating in the second mode. At the same time, when the movable carriage 102 is positioned, the movable carriage 102 can cooperate with the locking mechanism 112 to lock the drive control assembly 110 when engaged with the second drive assembly, as in the above explained example.

Further, in order to operate the locking mechanism 112 for locking the drive control assembly 110 in the engaged position for the determined mode of operation, the movable carriage 102 can be first actuated to unlock the drive control assembly 110 from a previous engaged position where the drive control assembly 110 operates in another mode of operation.

In addition, to be able to actuate the movable carriage 102 and the drive control assembly 110 in appropriate amounts, for example, for engagement and disengagement, a current position of the drive control assembly 110 and a current position of the movable carriage 102 can be determined. In one example, the current position of the drive control assembly 110 refers to the previous engaged position of the drive control assembly 110. In addition, the current position of the movable carriage 102 refers to the position of the movable carriage 102 along a path of movement when the drive control assembly 110 is in the previous engaged position, for instance, in the previous mode of operation of the imaging device 100.

Although aspects of the imaging device 100 have been described in language specific to structural features and/or methods, it is to be understood that the appended claims are not limited to the specific features or methods described. Rather, the specific features and methods are disclosed as examples of the imaging device 100.

I claim:

1. An imaging device comprising:
   a movable carriage;
   an image-forming mechanism mounted on the movable carriage;
   a first drive assembly to operably couple to the image-forming mechanism to operate the image-forming mechanism in a first mode of operation;
   a second drive assembly to operably couple to the image-forming mechanism to operate the image-forming mechanism in a second mode of operation;
   a drive control assembly to regulate transmission of drive from an actuator to the first drive assembly and the second drive assembly; and
   a locking mechanism to lock the drive control assembly in an engaged position with at least one of the first drive assembly and the second drive assembly, wherein the movable carriage is to actuate the locking mechanism to lock the drive control assembly in the engaged position.

2. The imaging device of claim 1, wherein the movable carriage is actuable by one of the first drive assembly and the second drive assembly.

3. The imaging device of claim 1, wherein the locking mechanism comprises a lock element rotatable about a fixed axis, the lock element comprising:

a first cooperating element to cooperate with the movable carriage to actuate to lock the drive control assembly; and a second cooperating element to cooperate with the drive control assembly to lock the drive control assembly.

4. The imaging device of claim 1, wherein the drive control assembly comprises a swing arm assembly to pivot about a fixed location on a body of the imaging device, the swing arm assembly comprising:

a lateral plate having a cooperating element to cooperate with the locking mechanism;

a driving transmission member rotatably mounted at one of the fixed location on a body of the imaging device and the lateral plate, wherein the driving transmission member is to operably couple to the actuator; and an engaging transmission member rotatably mounted at a fixed location on the lateral plate and engaged with the driving transmission member, wherein the engaging transmission member is to selectively transmit the drive from the driving transmission member to the first drive assembly and the second drive assembly.

5. The imaging device of claim 4, wherein the driving transmission member is mounted bearing a transition fit.

6. The imaging device of claim 1, wherein the image-forming mechanism is movable in the first mode of operation and is stationary in the second mode of operation.

7. The imaging device of in claim 1 further comprising a control unit to operate the actuator to:

regulate transmission of the drive to the drive control assembly; and regulate a direction of the drive to the drive control assembly.

8. A method comprising:

determining a mode of operation to operate an imaging device;

operating an actuator to engage a drive control assembly with a drive assembly, based on the determined mode of operation; and actuating a movable carriage to operate a locking mechanism of the imaging device to lock the drive control assembly in the engaged position.

9. The method of claim 8, wherein the operating the actuator comprises actuating the movable carriage to unlock the drive control assembly from a previous engaged position, wherein the drive control assembly operates in another mode of operation in the previous engaged position.

10. The method of claim 8, wherein the operating the actuator comprises determining a current position of the drive control assembly.

11. The method of claim 8, wherein the actuating the movable carriage comprises determining a current position of the movable carriage.

12. A non-transitory computer-readable medium comprising instructions executable by a processing resource to:

ascertain a change in a mode of operation of an imaging device;

determine a selected mode of operation to operate the imaging device;

operate an actuator to engage a drive control assembly with a drive assembly, based on the selected mode of operation;

actuate a movable carriage to operate a locking mechanism of the imaging device to lock the drive control assembly in the engaged position.

13. The non-transitory computer-readable medium of claim 12 comprising instructions executable by the processing resource to actuate the movable carriage to unlock the drive control assembly from a previous engaged position in a previous mode of operation.

14. The non-transitory computer-readable medium of claim 12 comprising instructions executable by the processing resource to determine a current position of the drive control assembly.

15. The non-transitory computer-readable medium of claim 12 comprising instructions executable by the processing resource to determine a current position of the movable carriage.

* * * * *

UNITED STATES PATENT AND TRADEMARK OFFICE
CERTIFICATE OF CORRECTION

PATENT NO.          : 10,298,793 B2
APPLICATION NO.     : 15/763511
DATED               : May 21, 2019
INVENTOR(S)         : Qian Tao Page 1 of 1

It is certified that error appears in the above-identified patent and that said Letters Patent is hereby corrected as shown below:

In the Claims

In Column 11, Line 28, Claim 7, after "of" delete "in".

Signed and Sealed this
Twenty-fourth Day of December, 2019

Andrei Iancu
*Director of the United States Patent and Trademark Office*